Oct. 2, 1934.   H. S. ALEXANDER ET AL   1,975,219
CUTTER FOR BIAS-CUTTING MACHINES
Filed Aug. 5, 1932
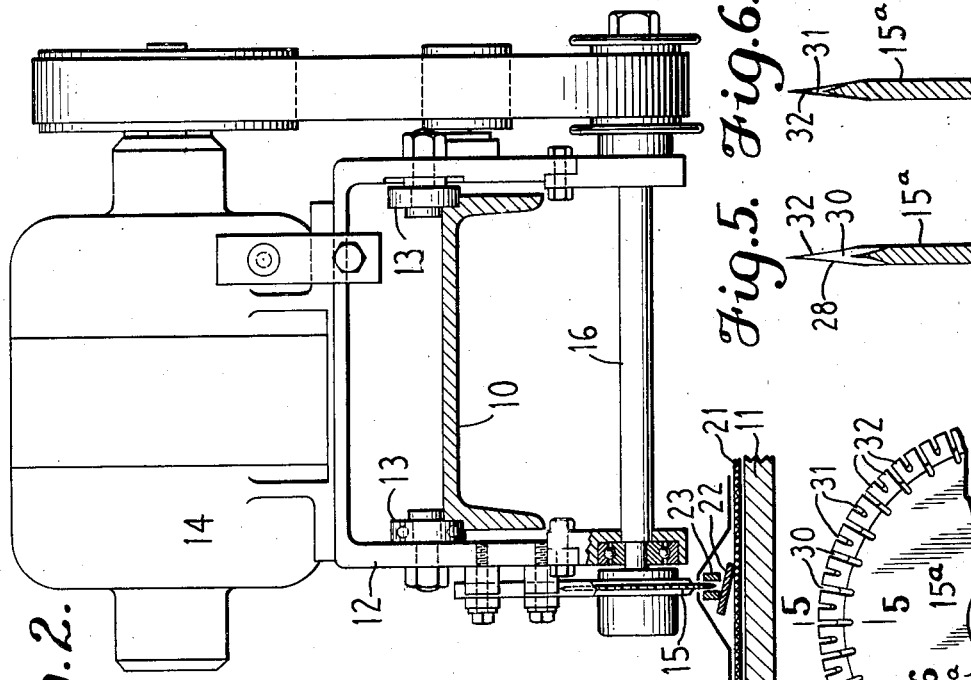
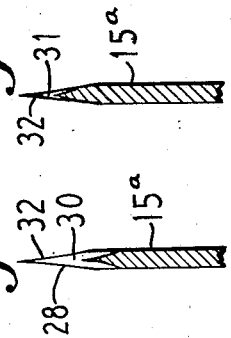
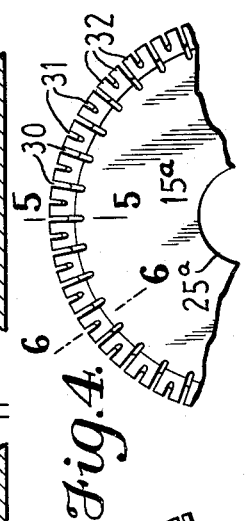
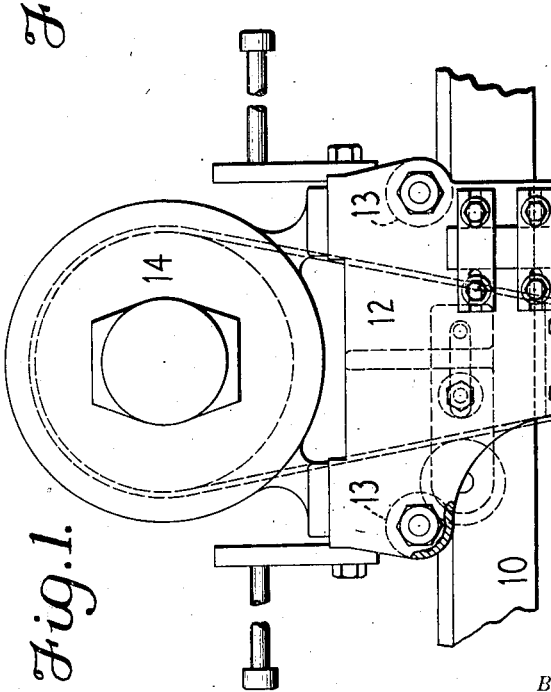
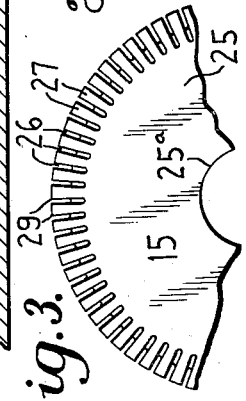
INVENTOR
HARRY S. ALEXANDER,
FRED B. PFEIFFER, &
BY   JOHN W. WHITE
Morrison Kennedy & Campbell
ATTORNEYS

Patented Oct. 2, 1934

1,975,219

UNITED STATES PATENT OFFICE 1,975,219

CUTTER FOR BIAS CUTTING MACHINES

Harry S. Alexander and Fred B. Pfeiffer, Akron, and John W. White, Wadsworth, Ohio, assignors to Seiberling Rubber Company, a corporation of Delaware Application August 5, 1932, Serial No. 627,570

13 Claims. (Cl. 164—70)

This invention relates to improvements in machines for cutting sheet materials, and refers particularly to the cutter of a machine for cutting fabric materials on the bias.

These machines are used extensively in the manufacture of pneumatic tire casings, wherein strips of rubberized fabric cut on the bias from long sheets of the material are used in building up the tire carcass. The particular machine in which the present invention is embodied is fully illustrated and described in original application for U. S. Letters Patent Serial No. 285,555, filed June 15, 1928, (now Patent No. 1,888,754) of which the present application is a continuation in part.

Bias cutting machines of the prior art usually employ cutters formed with smooth unserrated cutting edges, either in the form of knife blades or in the form of rotary disc cutters. In the use of such smooth-edge cutters, the cut is effected by a wedging or splitting action produced by forcefully running the material past the cutter or by moving the cutter through the material. In either case, however, the razor-like cutting edge, which it is necessary to maintain on the cutter, will last for only a few cuts, and as soon as the edge becomes slightly dull, the material wrinkles and piles up against the cutter and the latter either does not make a straight clean cut or else fails altogether to sever the material. Also, since the smooth-edge cutter is continuously in engagement with the rubberized fabric, a rather intensive frictional heat is developed, whereupon the rubber of the fabric becomes more plastic and readily adheres to the side edges of the cutter, gumming up the latter to such extent that the material sticks to the gummed sides and becomes badly wrinkled, the cutter than failing to make a true clean cut. Furthermore, when the cutter is the element which is moved, the material to be severed must be securely held in place while the cut is being made, or if the cutter is stationary, the material must be pulled past the cutter under tension.

The present invention is intended to obviate the foregoing and other difficulties, and to this end provides a cutter particularly adapted to sever a sheet of fabric as it lies freely and without tension on the delivery or conveyor belt of the machine by which it is progressed step by step for the successive bias cuts to be made. More specifically, the invention provides a cutter in the nature of a thin circular disc, having a sharpened periphery and formed with a plurality of radial slots extending inwardly from the periphery, which slots, among other things, permit the circulation of air to keep the cutting edge cool and allow for expansion due to frictional heat without having the cutting edge warp or buckle.

The foregoing and other objects, features, and advantages of the invention will be readily understood from the following description in connection with the accompanying drawing, wherein—

Fig. 1 is an enlarged end view of the cutter carriage of the machine, and showing the improved cutter embodied therein;

Fig. 2 is a side view of the carriage;

Fig. 3 is an enlarged section of the preferred embodiment of the cutter;

Fig. 4 is an enlarged section of a modified form of the cutter; and

Figs. 5 and 6 are enlarged vertical sections of the modified form of the cutter taken on the lines 5—5 and 6—6, respectively, of Fig. 4.

The bias cutting machine, which is completely shown and described in the original application already referred to, includes a structural steel channel member 10 spaced slightly above and disposed diagonally or obliquely with reference to the main frame 11 of the machine. Mounted for reciprocation on the channel member 10 is a carriage 12, provided with supporting rollers 13 which travel in guides or grooves adjacent the longitudinal edges of the channel member, thus facilitating movement of the carriage. The carriage in turn supports a motor 14 which drives the rotary cutter 15 mounted on a shaft 16 driven by a belt and pulley arrangement. A sheet 20, of rubberized fabric, is progressed by an endless belt conveyor 21, the sheet being fed forwardly step by step from a stock supply roll to cutting position by means not shown. The rubberized fabric sheet lies freely on the conveyor 21 and is fed without tension, and as it reaches the cutting position it is caused to pass over a separator bar 22, whereby it is raised slightly from the conveyor belt (see Fig. 2). The cutter rotates in a plane directly over the separator bar 22 and has associated with it a bifurcated wedge-shaped guide shoe 23 which is adapted to slide under the fabric and raise the same against the edge of the cutter, all in the manner fully set forth in the original application referred to above.

The preferred form of cutter 15, as shown in Figs. 1 and 3, comprises a thin circular metal disc 25, formed with a central aperture 25$^a$ by means of which the cutter may be detachably fitted on the end of the driven shaft 16 in the usual manner. The disc 25 is formed with a series of radial slots or notches 26 extending inwardly from its periphery to form well defined cutting teeth 27, preferably hollow ground as at 28, the slots being of equal width and depth for purposes presently to appear.

Actual practice has proved that the improved cutter 15 completely overcomes the difficulties already set forth. Thus, the radial slots 26 permit the cutting edge of the cutter to be air cooled and also allow the teeth 27 to expand when heated. Furthermore, if the rubber with which the fabric sheet 20 is impregnated becomes heated so that it tends to cling to the sides of the cutting edge, it cannot adhere thereto in a long continuous strip as in the case of a smooth-edge disc cutter, since the cutting edge is broken up by the slots 26, and the small pieces which do cling to the sides of the teeth 27 are largely thrown off by the rapid rotation of the cutter, thus making the cutter practically self-cleaning. Also, the cutter does not depend upon a wedging or splitting action for severing the fabric as does a smooth-edge cutter, but rather the corners 29 of the teeth 27 bite into the fabric and tend to pull the latter beneath the cutter, whereby there is produced a cutting or tearing action peculiarly adapted for severing rubberized fabric. With a cutter of this character which bites into the fabric, it is not necessary that the latter be tightly held in cutting position, and for this reason the improved cutter is especially adapted for use in a machine of the type set forth in the application above referred to, wherein the material to be severed lies flat and loosely on the conveyor.

It may be noted that the radial slots 26 which extend inwardly from the periphery of the cutter 15 to form the teeth 27 may be of any desired depth, but it has been found that the best results are obtained by forming the notches of a width within a certain limited range. For example, it has been found that in the case of cord tire fabric of .035″ gauge before rubberizing and approximately .050″ gauge after rubberizing, the width of the slots should preferably be not less than $\frac{1}{32}$″ nor greater than ⅛″.

In Figs. 4, 5 and 6 there is illustrated a modified form of the cutter 15ª, wherein the radial slots 30 and 31 formed in the periphery thereof extend inwardly alternately different distances. A cutter formed in this manner is advantageous in that the periphery is broken up to form teeth 32 of equal predetermined width spaced apart by slots of equal width, but which teeth, by virtue of the alternate long and short slots 30 and 31, respectively, are much stronger and less susceptible to breakage than the long thin teeth 27 of the cutter illustrated in Fig. 3.

Another advantage of forming the cutter 15ª with teeth defined by radial slots of alternately different lengths resides in the fact that the same cutter may be used for severing fabrics of different gauge or thicknesses. For example, when the cutter is employed to sever a very thin sheet of fabric, both the long and short slots 30 and 31, operate to produce the desirable results already set forth. On the other hand, if the cutter is used for severing fabric which is of greater thickness than the depth of the shorter radial slots 31, there still remain the longer slots 30 to function as above stated. Thus it will be seen that a cutter of this character obviates the necessity of changing cutters when materials of different thicknesses are successively run through the machine to be cut up into strips.

In the accompanying drawing, the invention is shown merely by way of example and in preferred form, but obviously many changes and variations may be made therein which will still be comprised within its spirit. It should be understood, therefore, that the invention is not limited to any specific form or embodiment, except insofar as such limitations are specified in the appended claims.

Having thus described our invention, what we claim is:

1. In or for a bias cutting machine for rubberized fabric, a rotary cutter movable transversely across the fabric and operative by a combined rip-saw and cutting action to produce successive bias cut strips, said cutter being in the form of a thin circular disc with a sharp periphery and having a plurality of radial slots extending inwardly from said periphery and defining cutting teeth whose cutting edges are concentric with the axis of the disc.

2. In or for a bias cutting machine for rubberized fabric, a rotary cutter movable transversely across the fabric and operative by a combined rip-saw and cutting action to produce successive bias cut strips, said cutter being in the form of a thin circular disc with a sharp periphery and having a plurality of radial slots, each of a uniform width throughout its length, extending inwardly from said periphery and defining cutting teeth whose cutting edges are concentric with the axis of the disc.

3. In or for a bias cutting machine for rubberized fabric, a rotary cutter movable transversely across the fabric and operative by a combined rip-saw and cutting action to produce successive bias cut strips, said cutter being in the form of a thin circular disc with a sharp periphery and having a plurality of equally spaced radial slots, all of the same width and each uniform throughout its length, extending inwardly from said periphery and defining cutting teeth whose cutting edges are concentric with the axis of the disc.

4. In or for a bias cutting machine for rubberized fabric, a rotary cutter movable transversely across the fabric and operative by a combined rip-saw and cutting action to produce successive bias cut strips, said cutter being in the form of a thin circular disc with a sharp periphery and having a plurality of equally spaced radial slots, of different lengths but of the same width and each of a uniform width throughout its length, extending inwardly from said periphery and defining cutting teeth whose cutting edges are concentric with the axis of the disc.

5. A cutter as set forth in claim 1, wherein the radial slots extending inwardly from the periphery thereof are at least $\frac{1}{32}$″ wide.

6. A cutter as set forth in claim 1, wherein the radial slots extending inwardly from the periphery thereof are not less than $\frac{1}{32}$″ nor more than ⅛″ wide.

7. In or for a bias cutting machine for rubberized fabric, a rotary cutter movable transversely across the fabric to produce successive bias cut strips, said cutter being in the form of a thin circular disc with a sharp periphery, and having a plurality of radial slots extending inwardly different distances from said periphery.

8. In or for a bias cutting machine for rubberized fabric, a rotary cutter movable transversely across the fabric to produce successive bias cut strips, said cutter being in the form of a thin circular disc with a sharp periphery, and having a plurality of radial slots of equal width extending inwardly different distances from said periphery.

9. In or for a bias cutting machine for rubberized fabric, a rotary cutter movable transversely across the fabric to produce successive bias cut strips, said cutter being in the form of a thin circular disc with a sharp periphery, and having a plurality of radial slots alternately extending inwardly different distances from said periphery.

10. In or for a bias cutting machine for rubberized fabric, a rotary cutter movable transversely across the fabric to produce successive bias cut strips, said cutter being in the form of a thin circular disc with a sharp periphery, and having a plurality of radial slots of equal width alternately extending inwardly different distances from said periphery.

11. A rotary cutter for rubberized fabric, said cutter being in the form of a thin circular disc with a sharp periphery and having a plurality of radial slots extending inwardly different distances from said periphery.

12. A cutter as set forth in claim 7, wherein the radial slots are of two different lengths, the slots of one length being alternately located with respect to the slots of the other length.

13. A cutter as set forth in claim 7, wherein the radial slots are of equal width but of two different lengths, the slots of one length being alternately located with respect to the slots of the other length.

HARRY S. ALEXANDER.
FRED B. PFEIFFER.
JOHN W. WHITE.